March 11, 1958
U. H. HUGHES
2,825,990
EVERGREEN ROPING MACHINE
Filed Oct. 31, 1955
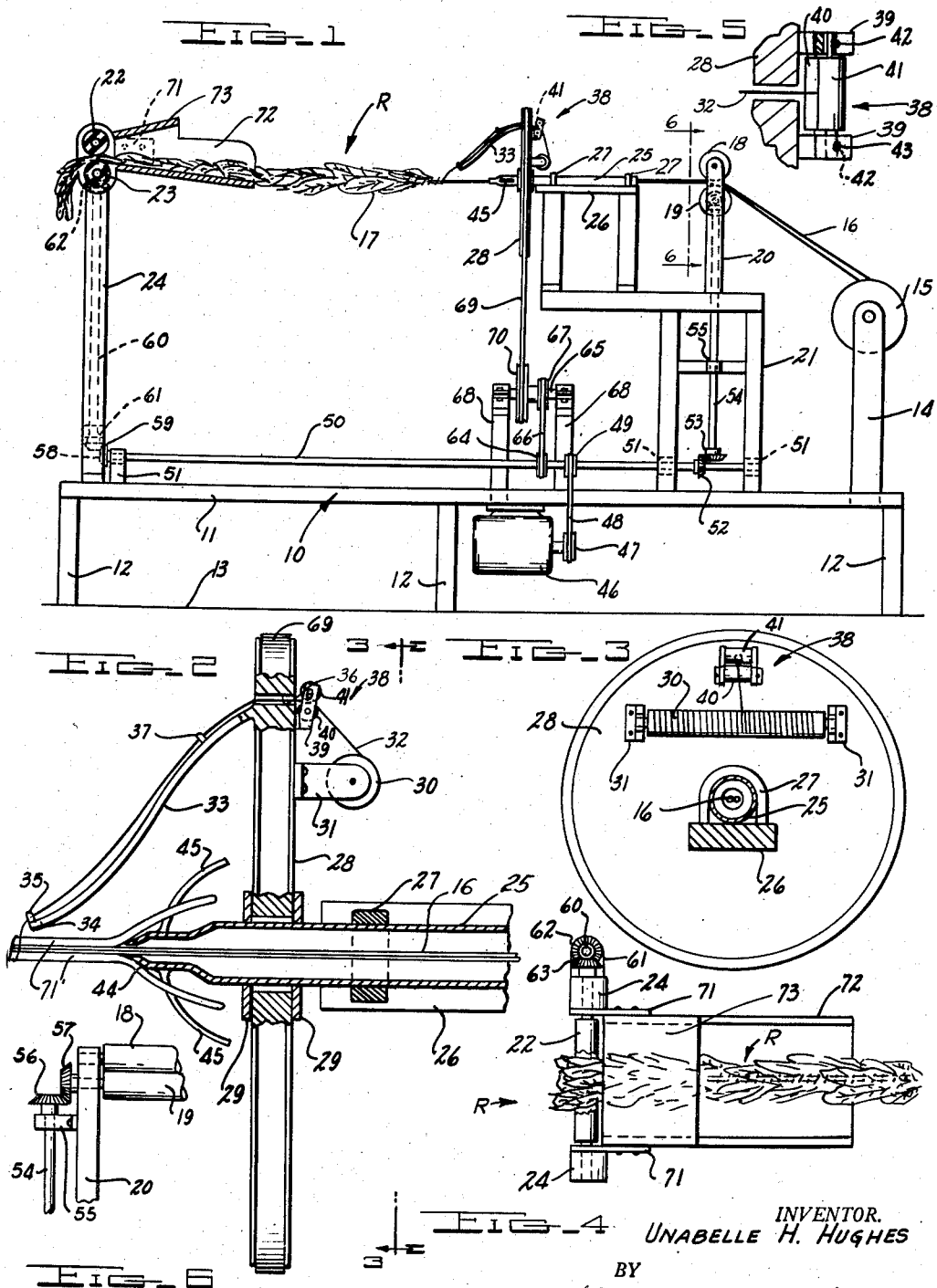
INVENTOR.
UNABELLE H. HUGHES
BY
ATTORNEYS United States Patent Office 2,825,990
Patented Mar. 11, 1958

2,825,990

EVERGREEN ROPING MACHINE

Unabelle H. Hughes, Pontiac, Mich.

Application October 31, 1955, Serial No. 543,705

6 Claims. (Cl. 41—3)

This invention relates to a roping machine and refers more particularly to a machine for producing evergreen roping.

Evergreen roping ordinarily consists of a flexible supporting member such as twine having bound thereto evergreen branches or boughs, the complete assembly providing an attractive holiday decoration which may be strung between spaced supports. The evergreen roping may also be looped in the form of wreaths.

One object of this invention is to provide an evergreen roping machine which is composed of a relatively few simple parts, and at the same time is an extremely efficient producer of evergreen roping.

Another object of the invention is to provide a machine for producing evergreen roping having means for advancing a length of twine or the like along a predetermined path, and means for wrapping a length of wire or other binding material around the twine to secure to the twine evergreen boughs placed against the twine as it advances.

Still another object of the invention is to provide means for guiding and laterally confining the twine to steady the latter during the operation of binding the boughs thereto.

A further object of the invention is to provide an evergreen roping machine of the above type having means for locating the boughs with respect to the machine and for preventing the boughs from rotating about the twine during the wrapping operation.

Other objects of the invention will become apparent as the following description proceeds, especially when taken in conjunction with the accompanying drawing wherein:

Figure 1 is a side elevational view, partly in section, of an evergreen roping machine constructed in accordance with the present invention.

Figure 2 is an enlarged top plan view, partly in section, of the winding mechanism embodied in the structure shown in Figure 1.

Figure 3 is a sectional view taken along the line 3—3 on Figure 2.

Figure 4 is a plan view of a portion of the structure shown in Figure 1.

Figure 5 is an enlarged sectional view of the wire tensioning means.

Figure 6 is a fragmentary elevational view taken along the line 6—6 on Figure 1.

Referring now more particularly to the drawing and especially to Figure 1 thereof, the evergreen roping machine there illustrated comprises a supporting frame 10 comprising a platform 11 supported on legs 12 in spaced relation above the supporting surface 13. Extending upwardly from the platform 11 are a pair of laterally spaced uprights 14, and a drum 15 extends between the uprights 14 and is journaled for rotation in the upper ends of the uprights. One of the uprights 14 is behind the other in Figure 1 and cannot be seen. The drum 15 has wound thereon one or more lengths of twine 16. In this instance, two lengths of twine 16 are wound upon the drum 15. The twine 16 constitutes the flexible linear member to which the evergreen boughs 17 are secured, and in order to make sure that the evergreen roping R has sufficient strength, two lengths of twine 16 are preferably employed. However, it will be understood that the evergreen roping may embody but one length of twine 16, if desired.

The twine 16 is drawn from the drum 15 by a pair of cooperating rolls 18 and 19 which are supported one above the other and have their opposite ends journaled in the upper end portions of the laterally spaced uprights 20. The axes of the rolls 18 and 19 extend parallel to the axis of drum 15, and the uprights 20 are secured to the standard 21 which is supported on platform 11. The rolls 18 and 19 cooperate with one another to grip the lengths of twine 16 therebetween and during the operation of the machine are effective to draw the twine from the drum.

The lengths of twine 16 are advanced from the rolls 18 and 19 by the cooperating rolls 22 and 23 which have their axes extending parallel to the axes of rolls 18 and 19 and which are located one above the other and have their opposite ends journaled for rotation in the upper end portions of the uprights 24 mounted on platform 11. The twine is advanced from the rolls 18, 19 to the rolls 22, 23 through an elongated tubular guide 25 which is fixedly secured to a support 26 mounted on the standard 21. Brackets 27 serve to rigidly secure the guide 25 to support 26. The peripheries of the rolls 18, 19 and of the rolls 22, 23 are preferably of soft resilient rubber and press against each other to have a firm gripping action on the twine.

Journaled on the tubular guide 25 adjacent its left hand or exit end is a wheel 28, and the spaced annular flanges 29, fixed upon the guide 25 confine the wheel against axial shifting movement while permitting free rotation thereof on the guide. The wheel carries a spool 30, the opposite ends of which are journaled in brackets 31 secured to the wheel. The spool 30 has wound thereon a length of flexible wire 32 which is employed to bind the evergreen boughs 17 to the twine 16. A needle 33 has one end secured to the wheel adjacent the outer periphery of the wheel and the free end 34 of the needle has an eye 35 located beyond the exit end of the guide 25 and in laterally offset relation to the path of travel of the twine which, of course, coincides with the axis of the guide. The wire 32 passes through an opening 36 in the wheel, an eye 37 on the needle and the eye 35, and upon rotation of the wheel 28, the needle is effective to wind the wire around the twine after the leading end of the wire has been initially wrapped once or twice about the twine to get it started.

In order to maintain wire 32 under tension, the tensioning device 38 is provided. The tensioning device 38 comprises a pair of laterally spaced brackets 39 secured to the wheel, and the cooperating rollers 40 and 41 have their opposite ends journaled for rotation in the brackets 39. The spindle ends of the roller 41 are loosely supported in the brackets 39 for movement toward and away from the roller 40, and are urged toward the latter by the compression coil springs 42 compressed between the spindle ends and the caps 43 which retain the springs in suitable recesses formed in the brackets 39. The springs bear against the spindle ends to frictionally resist rotation thereof and thereby resist rotation between the rollers 40 and 41 which engage each other as seen in Figure 5 and frictionally grip the wire 32 therebetween.

The exit end of the guide 25 has a reduced conical portion 44 which closely embraces and laterally confines the lengths of twine 16 to steady the twine during the wrapping operation. The arcuate finger guards 45 are secured to the guide at opposite sides thereof and extend in a horizontal plane and are provided to locate the bough stems and to prevent them from rotating during the wrapping operation.

A motor 46 is provided to drive the apparatus and is controlled by any suitable switch mechanism.

The output pulley 47 of the motor has a belt 48 wrapped around it which also extends around pulley 49 secured to the shaft 50. The shaft 50 is journaled for rotation in bearings 51 and has a bevel gear 52 meshing with a bevel gear 53 secured to vertical shaft 54 journaled for rotation in bearings 55. The upper end of the shaft 54 has a bevel gear 56 meshing with a bevel gear 57 secured to the roll 19. Since the resilient peripheries of the rolls 18 and 19 engage each other, both rolls will rotate in opposite directions to advance the twine from right to left as seen in Figure 1.

The shaft 50 has a second bevel gear 58 secured thereto in mesh with a bevel gear 59 secured to the lower end of vertical shaft 60 supported for rotation in bearings 61 and having a bevel gear 62 secured to the upper end. The bevel gear 62 meshes with a bevel gear 63 secured to the end of roll 23. The resilient peripheries of the rolls 22 and 23 engage each other so that these rolls rotate in opposite directions to advance the evergreen roping. The peripheries of the rolls 22 and 23 may if desired be spaced from each other to accommodate the somewhat bulky cross-section of the evergreen roping R, but in any event, both rolls will rotate due to the frictional engagement thereof with the evergreen roping.

Preferably the gearing is such that the peripheral speed of the rolls 22 and 23 is slightly greater than that of the rolls 18 and 19 to place a certain degree of tension on the length of roping between these sets of rolls to maintain the roping under tension.

The shaft 50 has a pulley 64 secured thereto which drives a shaft 65 by means of a belt 66 trained over the pulley 64 and a pulley 67 secured to shaft 65. The opposite ends of shaft 65 are journaled for rotation in the upper end portions of uprights 68 which are mounted on platform 11. A belt 69 extends around the grooved periphery of wheel 28 and around pulley 70 secured to shaft 65.

Brackets 71 are secured to the uprights 24 and serve to mount the funnel shaped guide 72. Guide 72 is in the form of an upwardly opening channel having the top section 73 across the upper edges of the channel flanges at the left hand end thereof. The guide 72 directs the foliage of the boughs on the roping between the rolls 22, 23.

In operation, the motor 46 is effective to rotate the rolls 18 and 19 to draw the twine from the drum and to rotate the rolls 22 and 23 at a slightly greater peripheral speed to advance the twine from the rolls 18 and 19 under a small amount of tension along a predetermined path through guide 25. At the same time, the wheel 28 is rotated so that the needle 32 moves continuously around the advancing twine. It is necessary to manually wind a turn or two of the wire 32 around the advancing twine to get it started, and thereafter, the continuous rotation of the needle will wrap the wire about the advancing twine in spiral fashion. The individual branches or boughs of evergreen which are preferably cedar boughs, are placed against the advancing twine manually with the stem end pointing toward the right. The boughs are positioned somewhat as illustrated in Figures 1 and 2 in which the ends of the stems 71' are disposed adjacent to the wheel 28 at the left hand side of the latter and the remainder of the stems and the foliage extend to the left beyond the free end of the needle. It is desirable to project a substantial length of the stem within the path of the needle as illustrated in Figure 2 so that the stem is securely bound to the twine.

It will be apparent that as the twine advances, the entire length of the stem to the right of the free end of the needle will be wrapped by a spiral length of wire and, of course, as each stem is wrapped, another bough should be placed upon the twine in overlapping fashion to the preceding one so that the stem of the preceding bough is covered up by the foliage of the next. The finger guards 45 prevent the boughs from rotating during at least a portion of the binding operation. The roping will emerge from the rolls 22, 23 with the evergreen boughs securely tied thereto and the boughs are slightly compressed by the rolls.

What I claim as my invention is:

1. An evergreen roping machine comprising an elongated tubular guide, means for advancing a flexible linear member along a predetermined path extending through said guide, means rotatable about said predetermined path for wrapping a flexible linear element around the member beyond the exit end of said guide to bind to the member an evergreen bough placed against the member during advance of the latter, and fingers carried by said guide extending laterally outwardly therefrom in a common plane at opposite sides of said predetermined path, said fingers being disposed in advance of said wrapping means to engage the evergreen bough placed against the member and prevent the same from rotating about said path during the binding operation.

2. An evergreen roping machine comprising an elongated tubular guide, means for advancing a flexible linear member under tension along a predetermined path extending through said guide, a wheel mounted on said guide for rotation about the axis of said guide, a spool on said wheel for holding a supply of a flexible linear element, a part on said wheel laterally offset from said axis and beyond the exit end of said guide operable upon rotation of said wheel to wrap the flexible linear element drawn from said spool around the linear member beyond said exit end of said guide to bind to said linear member an evergreen bough placed against the linear member during advance of the latter, means on said wheel for maintaining under tension the length of the linear element drawn from said spool, fingers carried by said guide extending laterally outwardly therefrom at opposite sides of said path in a common horizontal plane, said fingers being disposed in advance of said part to engage the evergreen bough placed against the member and prevent the same from rotating about said path during the binding operation, and means for rotating said wheel.

3. An evergreen roping machine comprising a drum for supporting a supply of twine or the like, means for drawing the twine from said drum comprising a pair of cooperating rolls frictionally gripping the twine therebetween, means located beyond said rolls for advancing the twine from said rolls along a predetermined path comprising a second pair of cooperating rolls frictionally gripping the twine therebetween, means for rotating said second pair of rolls at a greater peripheral speed than said first-mentioned pair of rolls to maintain the length of twine between said pairs of rolls under tension, an elongated tubular guide between said pairs of rolls surrounding said path and through which said length of twine travels, a wheel mounted on said guide for rotation about the axis of said guide, a spool on said wheel for holding a supply of wire or the like, a needle on said wheel having an eye at its free end laterally offset from said axis and beyond the exit end of said guide operable upon rotation of said wheel to wrap the wire drawn from said spool through said eye around said length of twine beyond said exit end of said guide to bind to said length of twine an evergreen bough placed against said length of twine during advance of the latter, means on said wheel for maintaining under tension the length of wire drawn from said spool, said second pair of rolls operating to slightly compress the boughs, means in advance of said second pair of rolls for guiding the boughs thereto, said tubular guide having means at the exit end thereof closely confining the length of twine laterally to steady the same during wrapping of the wire thereabout, fingers carried by said guide adjacent the exit end thereof extending laterally outwardly from said guide at opposite sides of said path in a common horizontal plane, said fingers being disposed in advance of the eye of said needle to engage the bough placed against the length of twine to prevent the same from rotating about said path during the binding operation, and means for rotating said wheel.

4. An evergreen roping machine comprising an elongated tubular guide, means for advancing a flexible linear member under tension along a predetermined path extending through said guide, a wheel mounted on said guide for rotation about the axis of said guide, a spool on said wheel for holding a supply of a flexible linear element, a part on said wheel laterally offset from said axis and beyond the exit end of said guide operable upon rotation of said wheel to wrap the flexible linear element drawn from said spool around the linear member beyond said exit end of said guide to bind to said linear member an evergreen bough placed against the linear member during advance of the latter, means on said wheel for maintaining under tension the length of the linear element drawn from said spool, means providing fingers at opposite sides of said path extending lengthwise thereof in advance of said part to engage the evergreen bough placed against the member and prevent the same from rotating about said path during the binding operation, and means for rotating said wheel.

5. An evergreen roping machine comprising a drum for supporting a supply of twine, means for drawing the twine from said drum comprising a pair of cooperating rolls frictionally gripping the twine therebetween, means located beyond said rolls for advancing the twine from said rolls along a predetermined path comprising a second pair of cooperating rolls frictionally gripping the twine therebetween, means for rotating said second pair of rolls at a greater peripheral speed than said first-mentioned pair of rolls to maintain the length of twine between said pairs of rolls under tension, an elongated tubular guide between said pairs of rolls surrounding said path and through which said length of twine travels, a wheel mounted on said guide for rotation about the axis of said guide, a spool on said wheel for holding a supply of wire, a needle on said wheel having an eye at its free end laterally offset from said axis and beyond the exit end of said guide operable upon rotation of said wheel to wrap the wire drawn from said spool through said eye around said length of twine beyond said exit end of said guide to bind to said length of twine an evergreen bough placed against said length of twine during advance of the latter, means on said wheel for maintaining under tension the length of wire drawn from said spool, said second pair of rolls operating to slightly compress the boughs, means in advance of said second pair of rolls for guiding the boughs thereto, and means for rotating said wheel.

6. An evergreen roping machine comprising a drum for supporting a supply of twine, means for drawing the twine from said drum comprising a pair of cooperating rolls frictionally gripping the twine therebetween, means located beyond said rolls for advancing the twine from said rolls along a predetermined path comprising a second pair of cooperating rolls frictionally gripping the twine therebetween, means for rotating said second pair of rolls at a greater peripheral speed than said first-mentioned pair of rolls to maintain the length of twine between said pairs of rolls under tension, an elongated tubular guide between said pairs of rolls surrounding said path and through which said length of twine travels, a wheel mounted on said guide for rotation about the axie of said guide, a spool on said wheel for holding a supply of wire, a needle on said wheel having an eye at its free end laterally offset from said axis and beyond the exit end of said guide operable upon rotation of said wheel to wrap the wire drawn from said spool through said eye around said length of twine beyond said exit end of said guide to bind to said length of twine an evergreen bough placed against said length of twine during advance of the latter, means on said wheel for maintaining under tension the length of wire drawn from said spool, said second pair of rolls operating to slightly compress the boughs, means in advance of said second pair of rolls for guiding the boughs thereto, said tubular guide having means at the exit end thereof closely confining the length of twine laterally to steady the same during wrapping of the wire thereabout, means providing fingers at opposite sides of said path extending lengthwise thereof in advance of the eye of said needle to engage the bough placed against the length of twine to prevent the same from rotating about said path during the binding operation, and means for rotating said wheel.

References Cited in the file of this patent

UNITED STATES PATENTS

| | | |
|---|---|---|
| 634,050 | Wittbold | Oct. 3, 1899 |
| 1,737,258 | Meyer | Nov. 26, 1929 |
| 2,414,378 | Kelman | Jan. 14, 1947 |